April 4, 1950   F. A. LANE   2,503,158
OSCILLATOR DRIVE
Filed July 7, 1945

INVENTOR.
FRED A. LANE,
BY
Hood & Hahn
ATTORNEYS.

Patented Apr. 4, 1950

2,503,158

UNITED STATES PATENT OFFICE 2,503,158

OSCILLATOR DRIVE

Fred A. Lane, Shelburn, Ind., assignor to Lane Motors, Incorporated, Terre Haute, Ind., a corporation of Indiana Application July 7, 1945, Serial No. 603,632

6 Claims. (Cl. 74—70)

The present invention relates to an oscillator drive. There are many applications in which such a mechanism will be advantageous; but one of the most common is in connection with the agitator of a washing machine; and I have illustrated my invention in such an environment. The primary object of the invention is to produce an improved drive for an oscillating element, whereby, with maximum efficiency, high speed rotation may be converted to relatively low speed oscillation. Further objects of the invention will appear as the description proceeds, and it will further appear that the mechanism hereinafter described is applicable to numerous associations.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
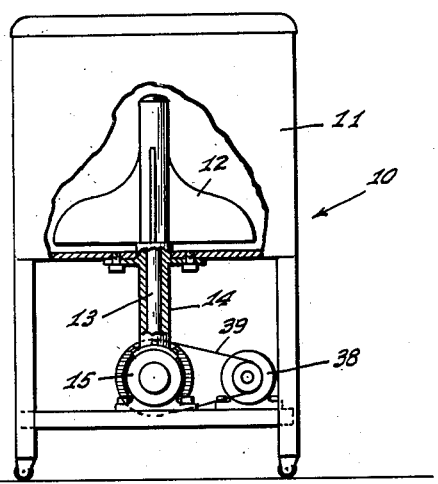
Fig. 1 is a side elevation of a washing machine in which my drive is associated, parts being broken away for clarity of illustration.
Figure 2:
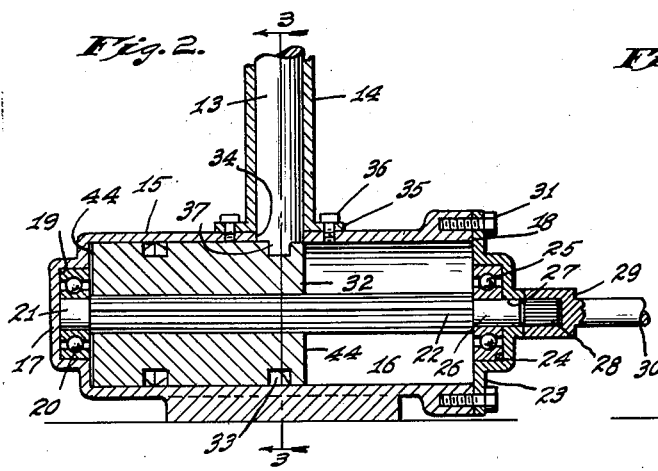
Fig. 2 is a longitudinal section through the drive, taken substantially on the line 2—2 of Fig. 3.
Figure 3:
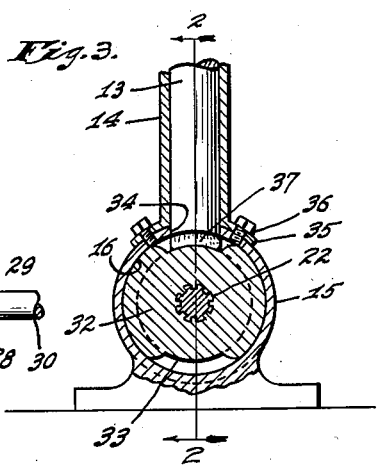
Fig. 3 is a transverse section therethrough, taken substantially on the line 3—3 of Fig. 2.
Figure 4:
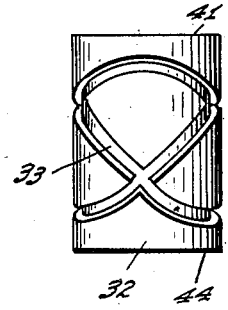
Fig. 4 is an elevation of a cam block forming a part of the drive.
Figure 5:
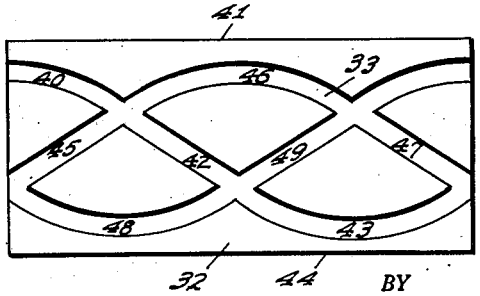
Fig. 5 is a plane development of the particular cam illustrated in Fig. 4.

The washing machine 10, which I have illustrated in Fig. 1, is formed, as usual, to provide a tub 11 in which is mounted an agitator 12 which is adapted to be oscillated about its vertical axis. The agitator 12 is mounted upon a shaft 13 which is journalled in a suitable housing 14.

Arranged upon an axis perpendicular to the axis of the housing 14 is a second housing 15 formed to provide a chamber 16 closed at one end by a wall 17, and open at its opposite end 18. The wall 17 is formed to provide a pocket 19 in which is mounted an anti-friction bearing 20 in which is journalled one end 21 of a splined shaft 22. A closure plate 23 for the open end 18 of the housing 15 is formed with a similar pocket 24 in which is mounted an anti-friction bearing 25 in axial alignment with the bearing 20; and the opposite end 26 of the shaft 22 is journalled in said bearing 25 and projects therethrough and through a central opening 27 in the closure plate 23 to the exterior of the housing. The projecting portion of the shaft end 26 may be splined, as at 28, for operative association with a socket 29 upon the end of a shaft 30. Said shaft 30 may carry a pulley adapted to be driven by a motor 38 through a belt 39.

The closure plate 23 may be secured to the open end 18 of the housing 15 by means of bolts 31, or the like.

Snugly received within the chamber 16, and mounted upon the portion of the shaft 22 which extends axially through said chamber, is a cam block 32. Obviously, the arrangement of the block 32 is such that it will rotate with the shaft 22 but may reciprocate with respect thereto, the axial length of said block being considerably less than the axial length of the chamber 16. The cam block 32 is formed with a continuous peripheral trackway 33 which, in the illustrated embodiment of the invention, takes the form of a groove cut into the cylindrical exterior surface of said block having at least one portion located adjacent one end of the block 32 and at least one portion located adjacent the opposite end of said block.

Intermediate its ends, the housing 15 is formed with a port 34; and the lower end of the housing 14 registers with said port 34, being provided, in the illustrated embodiment of the invention, with a foot 35 which is secured in place upon the housing 15 by bolts 36, or the like. At its lower end, the shaft 13 is provided with means operatively engaging the trackway 33. In the illustrated embodiment of the invention, that means comprises a foot or follower 37, whose length measured in the direction of length of the groove 33, is greater than the width of said groove.

In the illustrated embodiment of the invention, I have shown a trackway 33 which extends three times about the cylindrical surface of the cam block 32, but this is not an essential of my invention. As shown, the trackway 33 comprises a curved portion 40 leading from a point adjacent the end 41 of the cam into a straight section 42 which merges, in turn, with a curved section 43 adjacent the end 44 of the cam. Said curved section 43, in turn, merges with a section 45 which leads toward the end 41 of the cam, intersecting the section 42, and merging with a curved section 46. Said section 46 merges with a straight section 47 which leads into a curved section 48 adjacent the cam end 44, and said section 48 merges with a straight section 49 intersecting the reaches 42 and 47, and merging with the section 40 adjacent the cam end 41.

It will be clear that, as the cam rotates, assuming the foot 37 to be engaged in the portion 40 of the cam groove, the shaft 13 will be oscillated through approximately 22½° to enter the section 42. As the section 43 passes the foot 37, the shaft will be oscillated approximately 45° in the opposite direction to permit the foot to enter the section 45. As the foot follows the curved section 46, it will again be turned in the first direction through approximately 45°, and will then be turned in the second direction as it passes through the section 48 of the cam groove.

Obviously, the particular shape of the cam groove 33 will determine the frequency of oscillation of the shaft 13 and the degree of such oscillation, as the shaft 22 is rotated. It will be clear that the cam block 32 will reciprocate in the chamber 16 as it rotates to carry the various sections of the cam groove past the foot 37.

Without departing from my invention, the cross sectional shape of the cam groove may be changed in any desired fashion, or a raised rib may be formed upon the peripheral surface of the cam block 32 to be engaged by a bifurcated element at the base of the shaft 13.

I claim as my invention:

1. An oscillator drive comprising an element to be oscillated, a rotary input shaft, an oscillatory output shaft operatively connected to said element, a cam reciprocably splined on said input shaft and formed with a continuous peripheral groove extending substantially from end to end of said cam and means operatively associated with said output shaft and engaging in said groove, said last-named means having an extent in the direction of the length of said groove greater than the width of said groove.

2. An oscillator drive comprising an element to be oscillated, a rotary input shaft, a cam reciprocably splined on said shaft and formed with a continuous peripheral groove having portions differently spaced from an end of said cam, an oscillatory output shaft operatively connected to said element and mounted on a fixed axis perpendicular to a plane containing the axis of said input shaft, and means operatively associated with said output shaft and engaging in said groove, said last-named means having an extent in the direction of the length of said groove greater than the width of said groove.

3. An oscillator drive comprising an element to be oscillated, a rotary input shaft, a cam reciprocably splined on said shaft and formed with a continuous peripheral groove having portions differently spaced from an end of said cam, an oscillatory output shaft operatively connected to said element and mounted on a fixed axis perpendicular to the axis of said input shaft, and a foot fixed with respect to said output shaft and engaged in said groove, said foot having a dimension in the direction of the length of said groove greater than the width of said groove.

4. An oscillator drive for an element to be oscillated, comprising a housing formed to provide a cylindrical chamber, a shaft journalled in said chamber and extending from end to end thereof, a cylindrical cam reciprocable in said chamber and splined on said shaft, said cam being formed to provide a continuous peripheral trackway having portions located on different sides of a median transverse plane, a substantially radial port in said housing intermediate the ends thereof, a shaft journalled to extend through said port and adapted to be operatively associated with said element, and means operatively associated with said last-named shaft and guidingly engaging said trackway, whereby, upon rotation of said first-named shaft, said cam will be reciprocated within said chamber and said last-named shaft will be oscillated upon its axis to oscillate said element.

5. An oscillator drive comprising a housing formed to provide an elongated cylindrical chamber open at one end and closed at its opposite end, an anti-friction bearing supported in said closed end of said chamber, a splined shaft having one end journalled in said bearing, a closure plate for the open end of said chamber, a second anti-friction bearing carried by said closure plate, the opposite end of said shaft being journalled in said second bearing and projecting therethrough and through said closure plate to the exterior of said housing, a cylindrical cam block snugly received in said chamber and fitted on said shaft for rotation therewith and for reciprocation with respect thereto, the axial length of said block being less than that of said chamber, said cam block being formed to provide a continuous peripheral trackway extending from a point near one end of said cam block to a point near the opposite end of said cam block, said housing being formed with a port intermediate its ends, an output shaft journalled in alignment with said port, and means operatively associated with said output shaft through said port and operatively engaging said trackway to effect oscillation of said output shaft upon rotation of said first-named shaft.

6. For use in a washing machine including a tub, an agitator located in said tub, and a shaft connected to drive said agitator, means for oscillating said shaft, comprising a drive shaft, a cam reciprocably splined on said drive shaft and formed with a continuous peripheral trackway having a portion located near one end of said cam and a portion located near the other end of said cam, and follower means adapted to be operatively associated with said first-named shaft and operatively engaged with said trackway to follow the same as said drive shaft rotates and said cam rotates and reciprocates.

FRED A. LANE.

REFERENCES CITED

The following references are of record in the file of this patent:

UNITED STATES PATENTS

| Number | Name | Date |
| --- | --- | --- |
| 300,539 | Warwick | June 17, 1884 |
| 703,825 | Quist | July 1, 1902 |
| 811,868 | Paarmann | Feb. 6, 1906 |
| 824,969 | Anderson et al. | July 3, 1906 |
| 1,177,428 | Melin | Mar. 28, 1916 |
| 2,277,195 | Alpaugh | Mar. 24, 1942 |